(12) United States Patent
Kim

(10) Patent No.: US 9,037,393 B2
(45) Date of Patent: May 19, 2015

(54) OBJECT RECOGNITION SYSTEM

(71) Applicant: Hyundai Mobis Co., Ltd., Seoul (KR)

(72) Inventor: Young Shin Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/202,659

(22) Filed: Mar. 10, 2014

(65) Prior Publication Data

US 2015/0006070 A1    Jan. 1, 2015

(30) Foreign Application Priority Data

Jun. 26, 2013 (KR) .................. 10-2013-0073835

(51) Int. Cl.
*G01S 17/93* (2006.01)
*G08G 1/16* (2006.01)

(52) U.S. Cl.
CPC .............. *G01S 17/936* (2013.01); *G08G 1/166* (2013.01)

(58) Field of Classification Search
USPC ......... 701/1, 23, 28, 400, 408, 514, 519, 523, 701/532, 300, 301; 340/901, 903, 904, 905, 340/933, 942, 988, 989, 425.5, 435, 438; 180/167, 169, 271
See application file for complete search history.

(56) References Cited

U.S. PATENT DOCUMENTS

2005/0189503 A1*   9/2005   Jamieson et al. .......... 250/559.4

FOREIGN PATENT DOCUMENTS

KR         10-1188584         10/2012

* cited by examiner

*Primary Examiner* — Thomas Tarcza
*Assistant Examiner* — Edward Pipala
(74) *Attorney, Agent, or Firm* — NSIP Law

(57) ABSTRACT

Provided is an object recognition system including: a transmitting unit configured to include one or more light emitting unit to transmit laser light having different wavelengths to an object; a receiving unit configured to receive light reflected from the object to acquire information on the reflected light of a size, a speed, a number plate, a reflector, and material of the object; and a processing unit configured to store the feature information on objects of a vehicle, a two-wheeled vehicle, and a pedestrian and compare the information on the reflected light of the object received from the receiving unit with the feature information on the object to classify and recognize the objects into the vehicle, the two-wheeled vehicle, and the pedestrian.

13 Claims, 4 Drawing Sheets

FIG. 3

| KIND OF OBJECT | SIZE (REAR) | SPEED | FEATURE OF REFLECTANCE |
|---|---|---|---|
| VEHICLE | LARGE (ABOUT 2X1.5m) | 0~200km | ONE OR TWO REFLECTORS, NUMBER PLATE, METAL MATERIAL |
| TWO-WHEELED VEHICLE | SMALL (ABOUT 1.7X0.7m) | 0~150km | ONE REFLECTOR, NUMBER PLATE, METAL OR SKIN OR CLOTH MATERIAL |
| PEDESTRIAN | SMALL (ABOUT 1.7X0.6m) | 0~30km | SKIN OR CLOTH MATERIAL |
| Unknown | — | — | — |

OBJECT RECOGNITION SYSTEM

CROSS-REFERENCE TO RELATED APPLICATION

This application claims priority to and the benefit of Korean Patent Application No. 10-2013-0073835 filed in the Korean Intellectual Property Office on Jun. 26, 2013, the entire contents of which are incorporated herein by reference.

TECHNICAL FIELD

The present invention relates to an object recognition system equipped in a vehicle, and more particularly, to an object recognition system having high classification performance by using a multi-wavelength LIDAR sensor.

BACKGROUND OF THE INVENTION

Recently, a system of recognizing a pedestrian ahead of a vehicle and issuing a warning to a driver or automatically performing a braking control or a steering control when the vehicle is in a danger of colliding with the pedestrian in order to avoid a collision has been developed.

To properly operate the system, a rapid and accurate determination on whether an object ahead of a vehicle is a pedestrian, a vehicle, or other objects needs to be first performed.

As a method for recognizing an object ahead of a vehicle, a method of using a camera, a method of using a range sensor, and the like are currently used.

As the method of using a camera, there are a method of using an infrared camera, a method of using a stereo camera, a method of using a mono camera, and the like, and as the method of using a range sensor, there are a method of using an ultrasonic sensor, a method of using radar, a method of using laser radar, and the like.

However, the methods have a limitation of accurately and rapidly determining obstacles ahead of a vehicle.

RELATED ART DOCUMENT

Patent Document

Korean Patent Laid-Open Publication No. 2009-0021724 (Filing Date: Aug. 28, 2007)

SUMMARY OF THE INVENTION

The present invention has been made in an effort to provide an object recognition system capable of recognizing an object with high reliability by recognizing the object using a multi-wavelength laser and classifying the object using a feature of reflected light of the corresponding object.

An exemplary embodiment of the present invention provides an object recognition system, including: a transmitting unit configured to include one or more light emitting units to transmit laser light having different wavelengths to an object; a receiving unit configured to receive light reflected from the object to acquire information on the reflected light of a size, a speed, a number plate, and a reflector of the object and the material of the object; and a processing unit configured to store the feature information on objects of a vehicle, a two-wheeled vehicle, and a pedestrian and compare the information on the reflected light of the object received from the receiving unit with the feature information on the object to classify and recognize the objects into the vehicle, the two-wheeled vehicle, and the pedestrian.

The processing unit may include: a learning machine configured to store the feature information on the object; and a classifier configured to compare the information on the reflected light of the object with the feature information on the object to classify the object.

The learning machine may include the feature information on the objects of the vehicle, the two-wheeled vehicle, the pedestrian, and the unidentified object and the learning machine includes the feature information on the objects of the vehicle, the two-wheeled vehicle, the pedestrian, and the unidentified object and the feature information on the object includes the size of the object, the speed of the object, the presence or absence of the reflector depending on reflectance of the object, the number of number plates, and the material of the object.

The classifier may compare the information on the reflected light received from the receiving unit and the feature information stored in the learning machine to increase weights for the vehicle, the two-wheeled vehicle, the pedestrian, and the unidentified object.

The classifier may increase the weight for the vehicle if it is determined that the size of the object in the information on the reflected light is similar to the size of the vehicle of the feature information and increase the weights for the two-wheeled vehicle and the pedestrian if it is determined that the size of the object is smaller than that of the vehicle of the feature information.

The classifier may increase the weights for the vehicle and the two-wheeled vehicle if it is determined that the speed of the object in the information on the reflected light is faster than that of the pedestrian of the feature information and increase the weight for the pedestrian if it is determined that the speed of the object is similar to that of the pedestrian of the feature information.

The classifier may increase the weight for the vehicle if it is determined that one or more reflector is present in the object based on the reflectance in the information on the reflected light, increase the weights for the vehicle and the two-wheeled vehicle if it is determined that one reflector is present in the object, and increase the weights for the pedestrian and the unidentified object if it is determined that the reflector is not present in the object.

The classifier may increase the weights for the vehicle and the two-wheeled vehicle if it is determined that the number plate is present in the object based on the reflectance in the information on the reflected light and increase the weights for the pedestrian and the unidentified object if it is determined that the number plate is not present in the object.

The classifier may increase the weights for the vehicle and the two-wheeled vehicle if it is determined that the material of the object is metal based on the reflectance in the information on the reflected light, increase the weight for the pedestrian if it is determined that the material of the object is cloth or skin, and increase the weight for the two-wheeled vehicle if it is determined that the material of the object is a material in which the metal is mixed with cloth or skin.

The classifier may increase the weight for the unidentified object if it is determined that the material of the object has low similarity to the reflectance of the feature information on the objects stored in the learning machine based on the reflectance in the information on the reflected light.

According to an object recognition system according to the exemplary embodiments of the present invention, it is possible to provide high object recognition performance by increasing the weights for a vehicle, a two-wheeled vehicle, a pedestrian, and the like by comparing the information on the reflected light of the object with the feature information on the objects stored in the learning machine based on the laser reflected light received from the object.

BRIEF DESCRIPTION OF THE DRAWINGS

FIG. 3 is a schematic diagram illustrating feature information on objects stored in a learning machine.

DETAILED DESCRIPTION OF THE EMBODIMENTS

Hereinafter, an object recognition system according to exemplary embodiments of the present invention will be described in detail with reference to the accompanying drawings.

Figure 1:
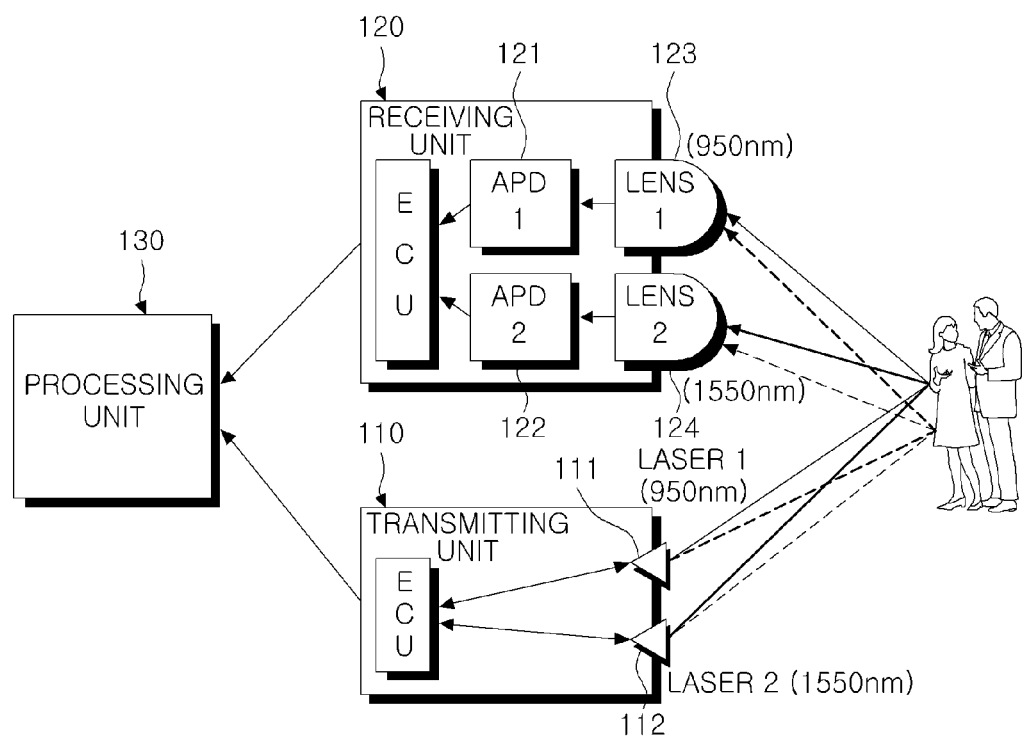
FIG. 1 is a schematic diagram of an object recognition system according to an exemplary embodiment of the present invention.

As illustrated in FIG. 1, an object recognition system 100 according to the exemplary embodiment may include a transmitting unit 110 which includes a first light emitting unit 111 and a second light emitting unit 112 to transmit multi-wavelength laser light, a receiving unit 120 which includes two avalanche photo diodes (APDs) to receive information on light reflected from an object, and a processing unit 130 which recognizes the object from the information on the reflected light received through the receiving unit 120.

The transmitting unit 110 includes the first and second light emitting units 111 and 112 to transmit the multi-wavelength laser light to an object ahead of a vehicle, in which the first light emitting unit 111 and the second light emitting unit 112 may emit laser light having different wavelengths. According to the exemplary embodiment of the present invention, the first light emitting unit 111 may emit laser light having a wavelength of 950 nm and the second light emitting unit 112 may emit laser light having a wavelength of 1550 nm. Unlike this, when the laser light emitted from the first and second light emitting units 111 and 112 has different wavelengths, the wavelengths may be freely changed.

The receiving unit 120 may include first and second APDs 121 and 122 to receive the reflected light when the laser light emitted from the transmitting unit 110 is reflected from an object and first and second lenses 123 and 124 for transforming diffused light into parallel light may be provided ahead of the first and second APDs 121 and 122.

The receiving unit 120 may acquire information on reflected light of an object, that is, information on a size of an object, a speed of an object, the number of reflectors which may be obtained based on a radiance of light reflected from an object, whether a number plate is present, and a material of an object, and information on a distance value which is distance information between objects and a coordinate value which indicates a position of an object, based on the reflected light received.

Figure 2:
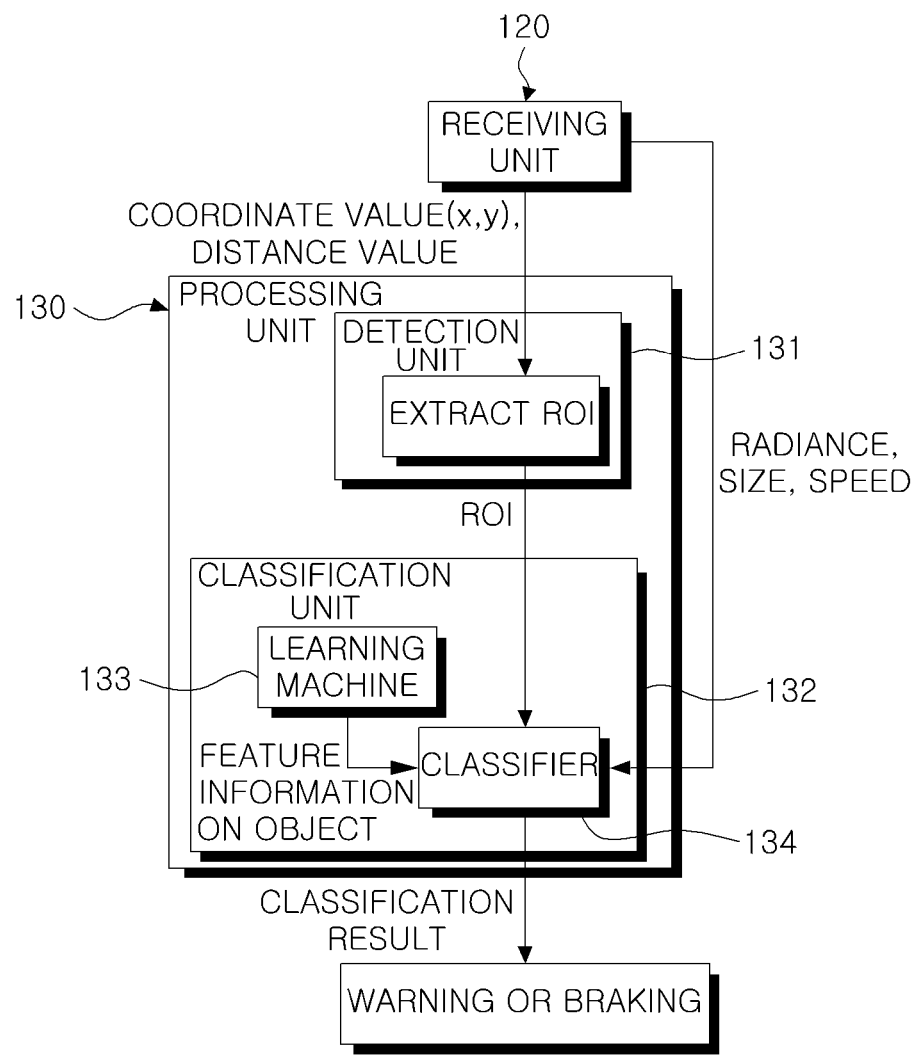
FIG. 2 is a schematic diagram of a processing unit of FIG. 1.

The processing unit 130 is to recognize an object ahead of a vehicle based on the information on the reflected light received from the receiving unit 120 and as illustrated in FIG. 2, may include a detection unit 131 and a classification unit 132.

The detection unit 131 detects a surrounding area having the same distance value as one object using the distance information transferred from the receiving unit 120 to be able to detect a region of interest (ROI).

The classification unit 132 according to the present embodiment may classify an object within the region of interest based on the information on the reflected light received from the receiving unit 120 and may include a learning machine 133 in which features of an object about a kind of object are stored and a classifier 134 which compares the information on the reflected light received from the receiving unit 120 with features of the objects stored in the learning machine 132 to classify the object, such that the classification unit 132 may classify the object in front of the vehicle as a vehicle, a pedestrian, a two-wheeled vehicle, and an unidentified object using the classifier 134.

The learning machine 133 stores feature information on the vehicle, the two-wheeled vehicle, and the pedestrian, respectively and as illustrated in FIG. 3, the feature information may be classified into the features of the size, speed, and reflectance of an object and the number of reflector, whether the number plate is present, and the material of an object may be classified based on the reflectance feature.

According to the exemplary embodiment of the present invention, a radiance used at the time of classifying an object may be replaced and used by the reflectance (Albedo).

If it is assumed that the object to be classified by the reflection of the laser light is a lambertian surface, the albedo which is a unique reflectance has a constant value depending on the material of an object and a wavelength of light.

The lambertian surface is a reflector having a uniform velocity of light in all directions which is exemplified as an angle between a normal line and a direction of the reflected light which is changed to a cosine function value, that is, a unit solid angle and means that a strength of the reflected light depending on an angle of an object surface is constant independent of a viewing angle.

On the other hand, the radiance received by the receiving unit 120 according to the exemplary embodiment has different values depending on the shape, illumination, and viewpoint of an object even in the same object.

Therefore, in order for the classification unit 132 to accurately classify an object, the albedo having a unique characteristic of the object needs to be used and the radiance obtained from the receiving unit 120 may be replaced by the albedo (reflectance) in consideration of the actual application environment of the vehicle recognition system.

The radiance of light is measured as a gray value I and may be represented by a product of K which is the albedo depending on the material of the object by G which is elements related with the shape, illumination, and viewpoint of the object.

Meanwhile, when considering the actual vehicle environment, since the illumination and the viewpoint are fixed and the objects (vehicle, two-wheeled vehicle, pedestrian, and the like) have similar shape features, it may be assumed that the strength of light and geometrical structures of objects are the same. Therefore, it may be assumed that the radiance from a LIDAR sensor is the albedo in which the reflectance depending on a wavelength of light is constant.

Therefore, in the actual application environment of the vehicle recognition system, the G values between other objects are substantially similar and therefore the difference in the radiance is represented by the difference in the material of the object. Therefore, the albedo depending on a kind of object having different material types may be simplified based on the simple comparison of the radiance.

That is, the classifier 134 according to the exemplary embodiment replaces the radiance of the multi-wavelength reflected light received from the receiving unit 120 with the albedo (reflectance) and compares the albedo with the reflectance feature depending on the kind of objects stored in the learning machine 133 and thus may use the comparison result as a variable recognizing the corresponding object.

Figure 4:
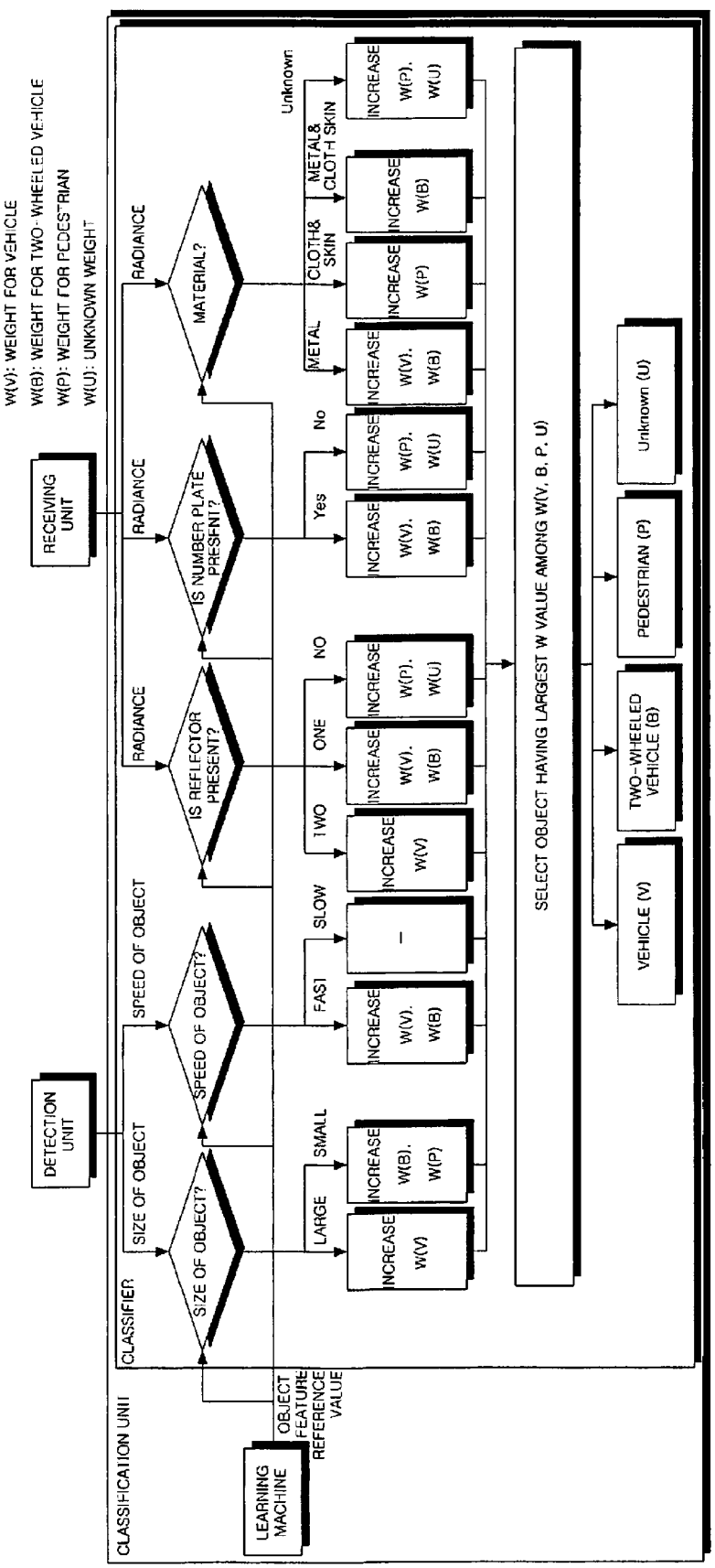
FIG. 4 is a schematic diagram illustrating a classification of an object based on feature information on the learning machine.

As illustrated in FIG. 4, the object recognition system 100 according to the exemplary embodiment of the present invention compares the features of the objects stored in the learning machine 133 with the features of the objects received through the receiving unit 120 and increases weights for objects corresponding to the corresponding objects, thereby classifying the received objects.

According to the exemplary embodiment of the present invention, the classifier 134 has weights for a vehicle, a two-wheeled vehicle, a pedestrian, and an unidentified object, which may each correspond to W(V), W(B), W(P), and W(U).

For example, if it is determined that the size of the object is similar to the feature (size) of the object stored in the learning machine 133 by comparing the size of the object with the feature (size) of the learning machine 133 based on the information on the reflected light of the object received from the receiving unit 120, the classifier 134 may increase the W(V) corresponding to the vehicle and if it is determined that the size of the object is smaller than the features (size) of the object stored in the learning machine 133, the classifier 134 may increase the W(B) and the W(P) which correspond to the two-wheeled vehicle and the pedestrian. Further, when the speed of the object is fast, the classifier 134 may increase the W(V) and the W(B) which correspond to the vehicle and the two-wheeled vehicle.

The classifier 134 may increase the W(V) which corresponds to the vehicle if it is determined that one or more reflector is present in the corresponding object based on the feature of the reflectance of the object received from the receiving unit 120, increase the W(V) and W(B) which correspond to the vehicle and the two-wheeled vehicle if it is determined that one reflector is present, and increase the W(P) and the W(U) which correspond to the pedestrian and the unidentified object if it is determined that the reflector is not present.

The classifier 134 may increase the W(V) and the W(B) which correspond to the vehicle and the two-wheeled vehicle if it is determined that the number plate is present in the corresponding object based on the feature of the reflectance of the object received from the receiving unit 120 and increase the W(P) and the W(U) which correspond to the pedestrian and the unidentified object if it is determined that the number plate is not present.

The classifier 134 may increase the W(V) and the W(B) which correspond to the vehicle and the two-wheeled vehicle if it is determined that the material of the corresponding object is a metal material based on the feature of the reflectance of the object received from the receiving unit 120, increase the W(P) which corresponds to the pedestrian if it is determined that the material of the corresponding object is cloth or skin, increase the W(B) which corresponds to the two-wheeled vehicle if it is determined that the metal and the cloth or the skin are present together, and may increase the W(P) and the W(U) which correspond to the pedestrian and the unidentified object if it is determined that the material of the object has low similarity to the feature of the reflectance stored in the learning machine 133, that is, the object is the unidentified object.

As such, according to the exemplary embodiment of the present invention, the classifier 134 synthetically compares the size, speed, reflector, number plate, and material of the object with the feature information on the objects stored in the learning machine 133 to increase the weights for the vehicle, the two-wheeled vehicle, the pedestrian, and the like, thereby classifying the corresponding object and therefore more increasing the object recognition performance as compared with the related art.

Hereinabove, although the object recognition system of the present invention is described with reference to the exemplary embodiments of the present invention, the scope of the present invention is not construed as being limited to the described embodiments and those skilled in the art will appreciate that modifications, changes, and various modified embodiments may be practiced without departing from the spirit of the invention.

What is claimed is:

1. An object recognition system recognizing an object from among prestored, predetermined objects, comprising:
   a transmitting unit configured to include one or more light emitting units to transmit laser light having different wavelengths to an object;
   a receiving unit configured to receive light reflected from the object to acquire information from the reflected light including a size, a speed, a number plate, a presence of a reflector on the object and a material of the object; and
   a processing unit configured to prestore feature information for the prestored, predetermined objects including a vehicle, a two-wheeled vehicle, and a pedestrian, and compare the information from the reflected light of the object with the feature information to classify and recognize the object as any one of the vehicle, the two-wheeled vehicle, and the pedestrian.

2. The object recognition system of claim 1, wherein the transmitting unit includes a first light emitting unit and a second light emitting unit to transmit the laser light to the object, and the first light emitting unit and the second light emitting unit emit the laser light with first and second wavelengths, respectively.

3. The object recognition system of claim 2, wherein the first wavelength is 950 nm and the second wavelength is 1550 nm.

4. The object recognition system of claim 3, wherein the receiving unit includes one or more avalanche photo diodes (APDs) to receive the reflected light, and one or more lenses to transform diffused light into parallel light.

5. The object recognition system of claim 1, wherein the processing unit comprises:
   a learning machine configured to store the feature information; and
   a classifier configured to compare the information from the reflected light with the feature information to classify the object.

6. The object recognition system of claim 5, wherein the feature information further includes information for an unidentified object, and the feature information of a respective object thereof includes a size of the object, a speed of the object, a presence a reflector depending on reflectance of the object, a number of number plates, and a material of the object.

7. The object recognition system of claim 6, wherein the classifier compares the information from the reflected light and the feature information to increase weights for the vehicle, the two-wheeled vehicle, the pedestrian, and the unidentified object.

8. The object recognition system of claim 7, wherein the classifier increases the weight for the vehicle if the size of the object in the information from the reflected light is similar to the size of the vehicle in the feature information, and increases the weights for the two-wheeled vehicle and the pedestrian if the size of the object in the information from the reflected light is smaller than that of the vehicle in the feature information.

9. The object recognition system of claim 7, wherein the classifier increases the weights for the vehicle and the two-wheeled vehicle if the speed of the object in the information from the reflected light is faster than that of the pedestrian in the feature information and increases the weight for the pedestrian if the speed of the object is similar to that of the pedestrian in the feature information.

10. The object recognition system of claim 7, wherein the classifier increases the weight for the vehicle if one or more reflectors is present on the object based on the reflectance of the reflected light, increases the weights for the vehicle and the two-wheeled vehicle if one reflector is present on the object, and increases the weights for the pedestrian and the unidentified object if the reflector is not present on the object.

11. The object recognition system of claim 7, wherein the classifier increases the weights for the vehicle and the two-wheeled vehicle if the number plate is present on the object based on the reflectance of the reflected light and increases the weights for the pedestrian and the unidentified object if the number plate is not present on the object.

12. The object recognition system of claim 7, wherein the classifier increases the weights for the vehicle and the two-wheeled vehicle if the material of the object is metal based on the reflectance of the reflected light, increases the weight for the pedestrian if the material of the object is cloth or skin, and increases the weight for the two-wheeled vehicle if the material of the object is a material in which metal is mixed with cloth or skin.

13. The object recognition system of claim 12, wherein the classifier increases the weight for the unidentified object if the material of the object has low similarity to reflectance in the feature information when compared with the reflectance of the reflected light.

\* \* \* \* \*